(12) United States Patent
Kikuchi et al.

(10) Patent No.: US 7,452,241 B2
(45) Date of Patent: Nov. 18, 2008

(54) CARD CONNECTOR

(75) Inventors: Hitoshi Kikuchi, Tokyo (JP); Hirokazu Takahashi, Tokyo (JP); Kazunori Takei, Tokyo (JP)

(73) Assignee: DDK Ltd., Tokyo (JP)

( * ) Notice: Subject to any disclaimer, the term of this patent is extended or adjusted under 35 U.S.C. 154(b) by 0 days.

(21) Appl. No.: 11/822,648

(22) Filed: Jul. 9, 2007

(65) Prior Publication Data

US 2008/0014788 A1 Jan. 17, 2008

(30) Foreign Application Priority Data

Jul. 12, 2006 (JP) ............................. 2006-191223

(51) Int. Cl.
*H01R 24/00* (2006.01)
(52) U.S. Cl. ..................................................... 439/630
(58) Field of Classification Search ................. 439/159, 439/630, 326, 912, 677, 540.1, 188, 59–62, 439/67; 361/737, 741, 726, 728, 736, 752, 361/756, 802, 807
See application file for complete search history.

(56) References Cited

U.S. PATENT DOCUMENTS

| 2001/0053622 | A1* | 12/2001 | Oguchi | 439/188 |
| 2005/0003711 | A1* | 1/2005 | Chang | 439/630 |
| 2005/0196994 | A1* | 9/2005 | Bilcauu et al. | 439/326 |

* cited by examiner

*Primary Examiner*—Edwin A. León
(74) *Attorney, Agent, or Firm*—Dickstein Shapiro LLP

(57) ABSTRACT

A card connector includes contacts adapted to contact contacts of two memory cards, a housing having inserting openings for inserting the memory cards and arranging and holding the contacts therein, and a shell covering the housing. The housing includes two side walls, a rear wall, and a lower wall contiguous with these side and rear walls to form the inserting openings for the memory cards by these two side walls, rear wall and lower wall, and is provided with a pivotally movable plate to form, by its pivotal movement, the one inserting opening for inserting either of the cards and simultaneously to prevent the other card from being inserted. The card connector enables stable connection by merely inserting two different cards having equal lengths in the inserting direction and different widths and thicknesses into the connector.

16 Claims, 9 Drawing Sheets

CARD CONNECTOR

BACKGROUND OF THE INVENTION

This invention relates to a card connector for use in various electric and electronic appliances such as a mobile phone, personal digital assistant (PDA), printer, card reader and the like for inputting and outputting signals into and from a memory card inserted into the card connector, and more particularly to a card connector with a structure achieving connection by merely inserting two different cards having equal lengths in the inserting direction and different widths and thicknesses.

In recent years, with the wide spread use of small type mobile phones and digital cameras and the like, memory cards having a large memory capacity and a compact shape have been used. A wide variety of memory cards have also been used depending upon characteristics and the like of appliances with which the memory cards are used, for example, SD card (Secure Digital memory card, registered trademark, referred to hereinafter just as "SD card"), Memory Stick card (registered trademark, referred to hereinafter just as "MS card"), and Micro type memory cards more downsized by MMC card (registered trademark) such as SD Micro card (registered trademark), Memory Stick Micro card (registered trademark), and Micro MMC card (registered trademark). Accordingly, as devices for writing and reading onto and from these various memory cards, memory card reader writers are increasingly being used in computers themselves or as peripheral devices.

As examples of card connectors using tray systems, incorporated herein are Japanese Patent Application Opened No. 2006-127,808 (Patent Literature 1) and Japanese Patent Application No. 2005-123,252 (Patent Literature 2).

Patent Literature 1

According to the abstract of the Japanese Patent Application Opened No. 2006-127,808, this invention has an object to provide a connector for small type cards, including a tray and a slide member compactly arranged.

Disclosed is a card connector 1 according to this prior art including a tray 10 on which a card C is to be loaded, and a slide member 12 movable together with the tray 10 relatively to the housing 2, wherein the tray 10 comprises a notch portion 10c at the rear end corner positioned on the side of insertion of the card C, and at least part 12b of the slide member 12 is arranged in a space formed by the notch portion 10c.

Patent Literature 2

According to the abstract of the Japanese Patent Application No. 2005-123,252, the object of this invention is to provide a card connector 10 enabling a reduced overall height of the connector with a simple construction, and this object can be achieved by a card connector 10 adapted to be connected to at least two cards 60 and including contacts 14 corresponding to the number of the cards 60, a tray 16 in which at least two cards 60 can be located, and a housing 12 having a fitting opening 20 for receiving the tray 16 and arranging and holding said contacts 14. As a card connector 10 adapted to be connected to four cards 60, disclosed is a card connector including contacts 14 of four kinds, a tray 16 having a card loading portion 22 into which the four cards 60 can be loaded, and a housing 12 for arranging and holding the contacts 14 of four kinds and having a fitting opening 20 for receiving the tray 16.

In recent years, with the miniaturization of appliances, the need for connectors to be more miniaturized has become stronger and the connectors have become lighter and more compact. On the other hand, according to specifications or requirements of customers, although there is an enough space in the direction of height of a connector, the size of the connector (occupied area of a substrate) is often limited.

With the tray systems described above, however, using a single tray inevitably enlarges the connector (occupied area of its substrate). In order to avoid such an enlargement of the connector (occupied area of the substrate) by the use of the single tray, use of a plurality of trays has often been proposed. However, the use of a plurality of trays would increase management cost, and insertion of a wrong tray is a problem to be solved.

SUMMARY OF THE INVENTION

In view of the problems of the prior art described above, the invention has an object to provide a card connector with a connecting structure enabling connection by merely inserting two different cards having equal lengths in the inserting direction and different widths and thicknesses into the connector.

The object described above can be accomplished by the card connector 10 according to the invention into and from which two memory cards 60, 62 are detachably inserted and removed, including contacts 14, 16 adapted to contact contacts of the memory cards 60, 62, a housing 12 having inserting openings 24 into which the memory cards 60, 62 are inserted, respectively, and arranging and holding said contacts 14, 16 therein, and a shell 18 covering said housing 12, wherein said housing 12 comprises two side walls 26, a rear wall 28, and a lower wall 30 contiguous with these side and rear walls 26, 28 to form said inserting openings 24 for said memory cards 60, 62 by these two side walls 26, rear wall 28 and lower wall 30, and said housing 12 is provided with a pivotally movable plate 20 to form, by its pivotal movement, the one inserting opening 24 for inserting either of said cards and simultaneously to prevent the other card from being inserted.

The card connector 10 as defined in claim 2 further comprises pivotal movement-restraining means for said plate.

In the card connector 10 as defined in claim 3, connection portions 143 of the contacts 14 corresponding to one card 60 extend onto the opposite side of the card inserting side, and connection portions 163 of the contacts 16 corresponding to the other card 62 extend onto the card inserting side, and further said plate 20 is provided with anchoring holes 42 into which said contacts 14 are inserted and with engaging portions 44 adapted to engage tip portions 144 of said contacts 14, respectively.

In the card connector 10 as defined in claim 4, said plate 20 is provided with an inducing portion 40, and said side walls 26 of said housing 12 are each provided in its inner side with a guide groove 34.

The card connector as defined in claim 5 is constructed to accommodate two cards having substantially equal lengths in the inserting direction.

When one card is inserted, said plate 20 is pivotally moved (rotated) so that an antenna terminal is pushed toward said contact 16 by said plate 20.

As can be seen from the above description, the card connector according to the invention can bring about the following significant functions and effects. (1) The card connector 10 according to the invention into and from which two memory cards 60, 62 are detachably inserted and removed, includes contacts 14, 16 adapted to contact contacts of the memory cards 60, 62, a housing 12 having inserting openings 24 into which either one of the memory cards 60, 62 is inserted, and arranging and holding said contacts 14, 16 therein, and a shell 18 covering said housing 12, wherein said housing 12 comprises two side walls 26, a rear wall 28, and a lower wall 30 contiguous with these side and rear walls 26, 28 to form said inserting openings 24 for said memory cards 60, 62 by these two side walls 26, rear wall 28 and lower wall 30, and said housing 12 is provided with a pivotally movable plate 20 to form, by its pivotal movement, the inserting opening 24 for inserting either one of said different cards and simultaneously to prevent the other card from being inserted. Therefore, a stable connection can be achieved with the simple construction by merely inserting either one of two different cards having different widths and thicknesses. Once either one of the two cards has been inserted, the other card is prevented from being inserted, thereby always permitting only one card to be inserted at a time. Since a tray or trays are not used, there is no longer any risk of a wrong tray being inserted.

(2) The card connector 10 as defined in claim 2 further comprises pivotal movement-restraining means for said pivotally movable plate 20. Consequently, as the space for inserting the card 60 into the upper portion can be ensured so the insertion of the card 60 into the upper portion of the card connector becomes easy.

(3) In the card connector 10 as defined in claim 3, connection portions 143 of the contacts 14 receiving one card 60 extend towards the opposite side of the card inserting side, and connection portions 163 of the contacts 16 receiving the other card 62 extend towards the card inserting side, and further said plate 20 is provided with anchoring holes 42 into which said contacts 14 are inserted and with engaging portions 44 adapted to engage tip portions 144 of said contacts 14, respectively. Therefore, buckling damage of the contacts 14 can be prevented, and the space for inserting the card 62 into the lower portion can be securely ensured.

(4) In the card connector 10 as defined in claim 4, said plate 20 is provided with an inducing portion 40, and said side walls 26 of said housing 12 are each provided in its inner side with a guide groove 34. Accordingly, the card 60 can be easily inserted into the upper portion of the card connector.

(5) The card connector as defined in claim 5 is constructed to accommodate two cards having substantially equal lengths in the inserting direction. Therefore, a stable connection can be achieved with the simple construction by merely inserting either one of two different cards having different widths and thicknesses. Once one card has been inserted, the other card is prevented from being inserted, thereby always permitting only one card to be inserted at a time.

(6) When one card 60 is inserted into the card connector, the plate 20 is pivotally moved (rotated) to push the antenna terminal 22 toward said contact 16 so that the gap between the contact 16 and said antenna terminal becomes narrower, thereby contributing to prevention of the noise between said contacts 14 and said antenna terminal 22.

The invention will be more fully understood by referring to the following detailed specification and claims taken in connection with the appended drawings.

DESCRIPTION OF THE PREFERRED EMBODIMENTS

Figure 1A:
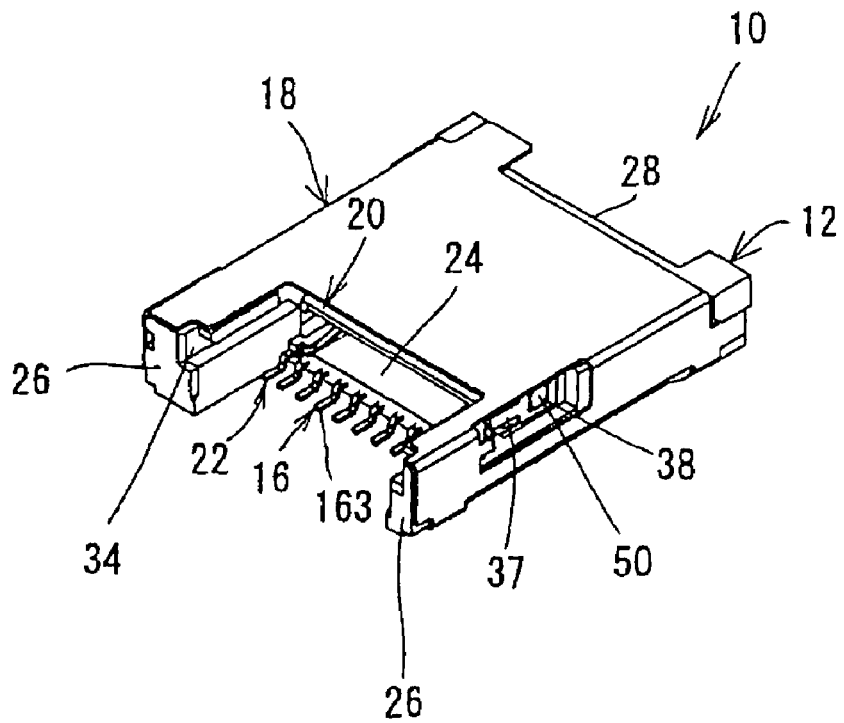
FIG. 1A is a perspective view of the card connector according to the invention viewed from the card inserting side.
Figure 1B:
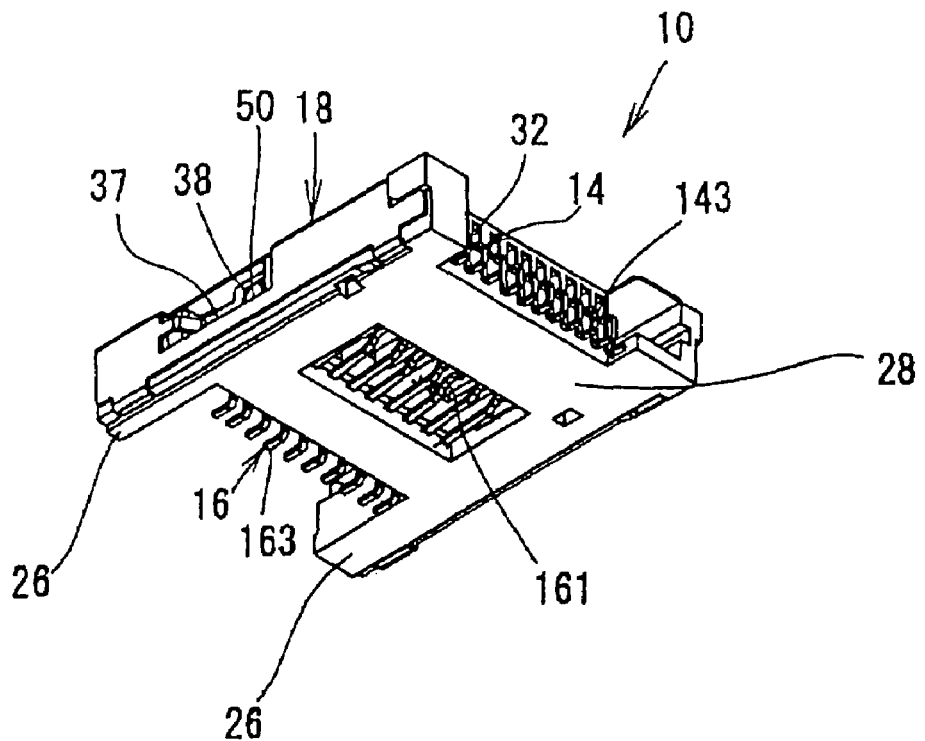
FIG. 1B is a perspective view of the card connector according to the invention viewed from the opposite side of the card inserting side.
Figure 2A:
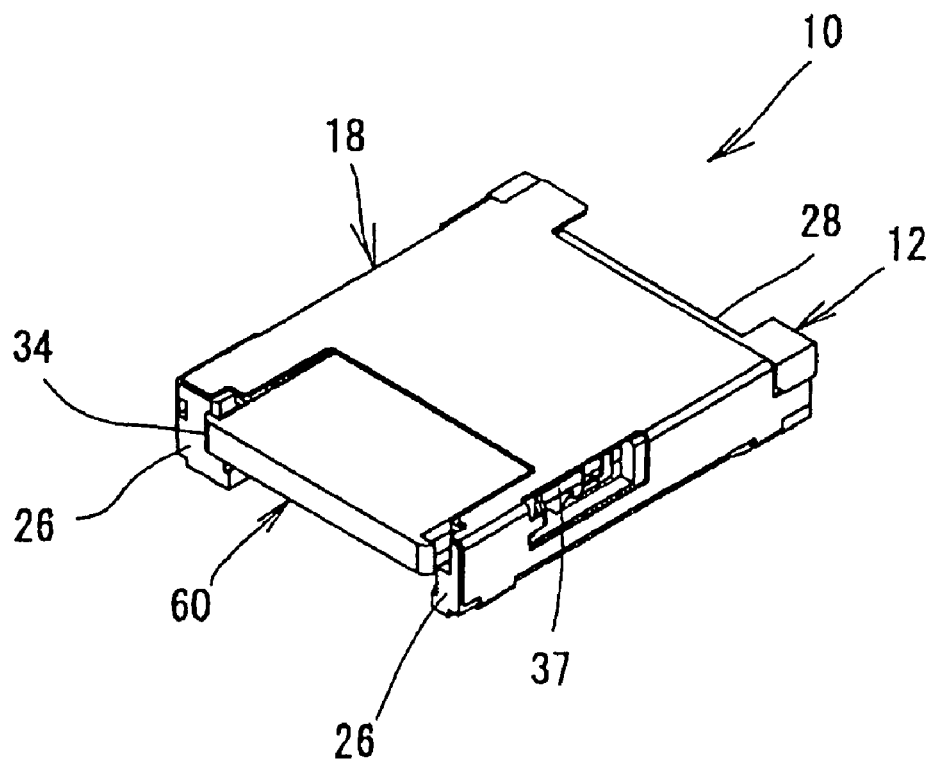
FIG. 2A is a perspective view of the card connector with one card inserted, viewed from the card inserting side.
Figure 2B:
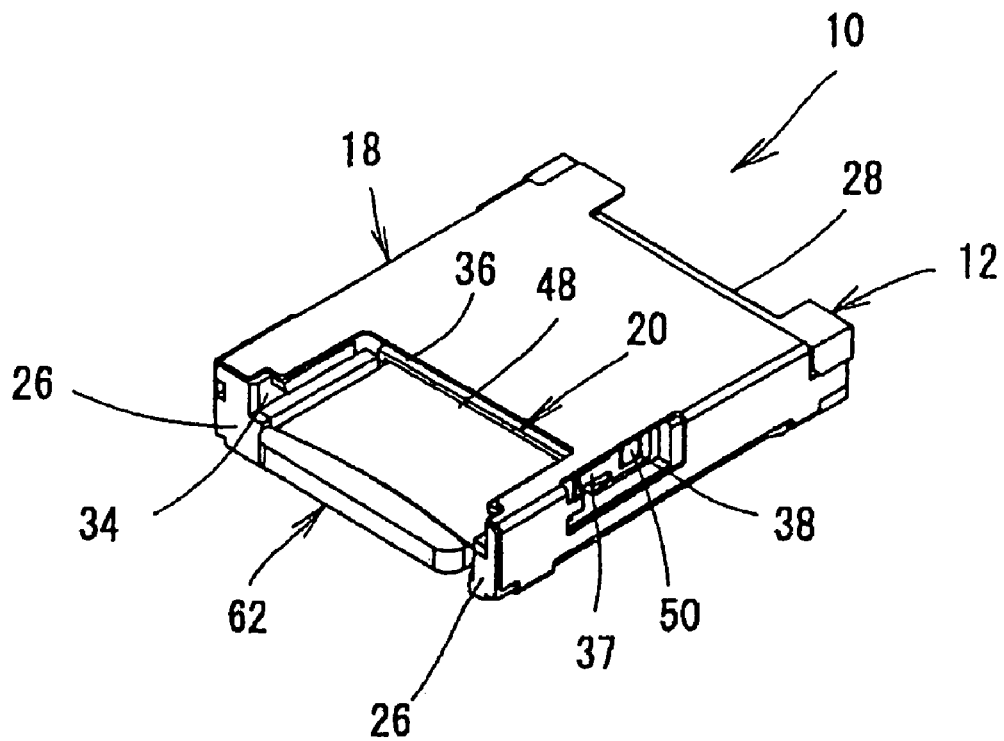
FIG. 2B is a perspective view of the card connector with the other card inserted, viewed from the card inserting side.
Figure 3A:
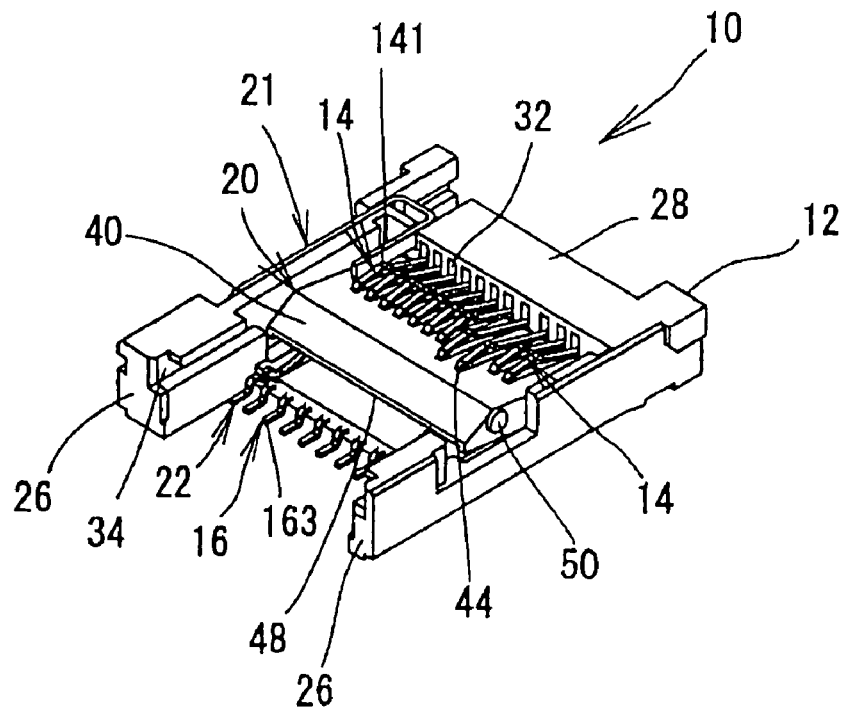
FIG. 3A is a perspective view of the card connector according to the invention with a shell removed, viewed from the card inserting side.
Figure 3B:
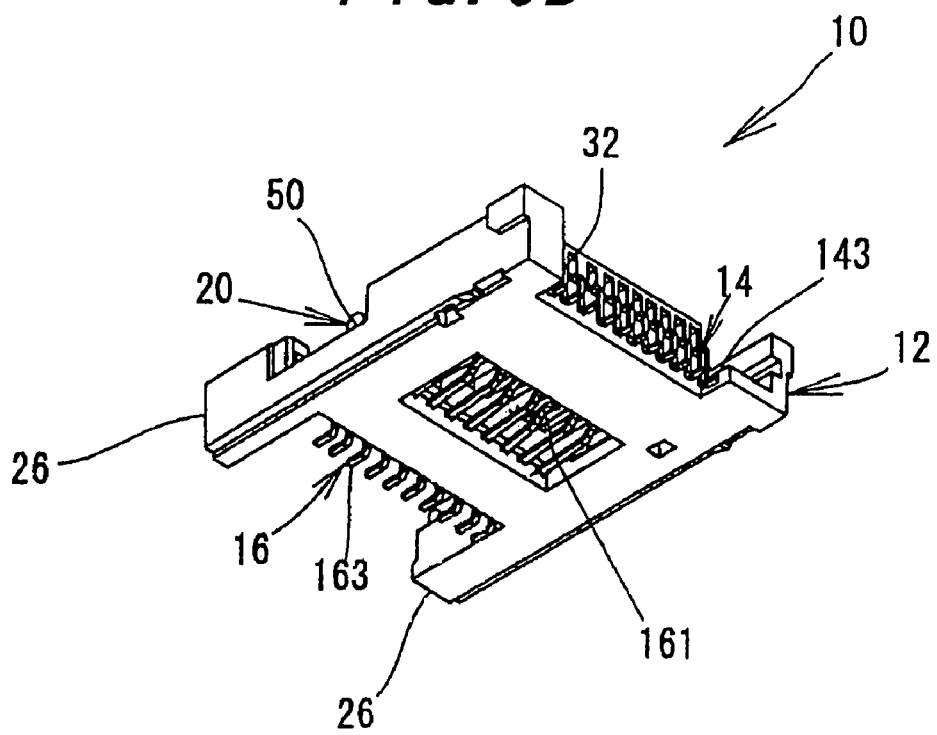
FIG. 3B is a perspective view of the card connector according to the invention with the shell removed, viewed from the opposite side of the card inserting side.
Figure 4A:
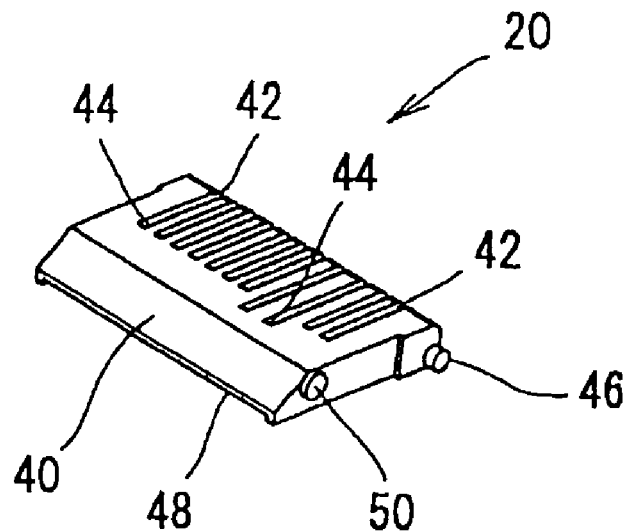
FIG. 4A is a perspective view of a plate viewed from the side of its inducing portion.
Figure 4B:
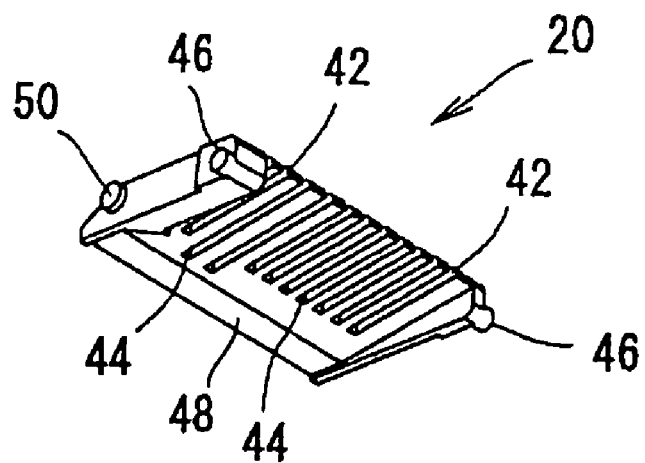
FIG. 4B is a perspective view of the plate viewed from the opposite side of the inducing portion.
Figure 5A:
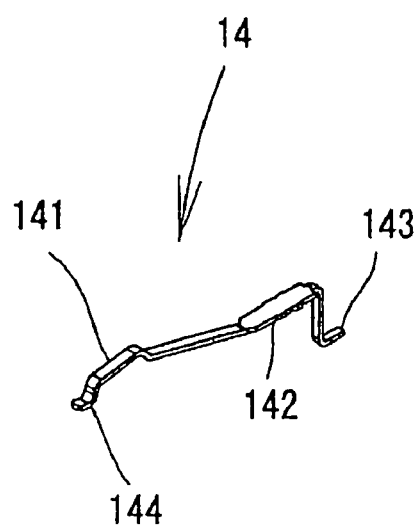
FIG. 5A is a perspective view of a single contact.
Figure 5B:
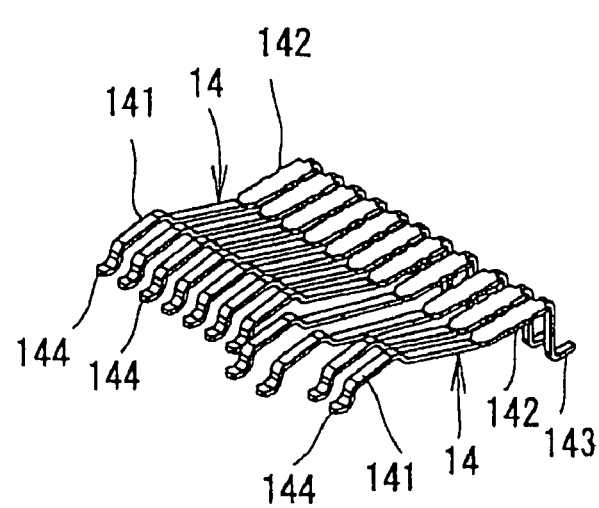
FIG. 5B is a perspective view illustrating an arrangement of the contacts.
Figure 5C:
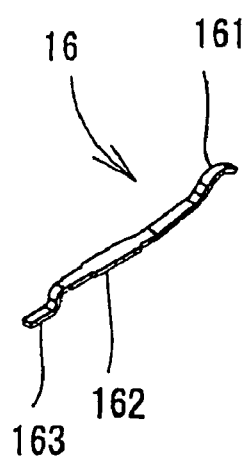
FIG. 5C is a perspective view of a single contact.
Figure 5D:
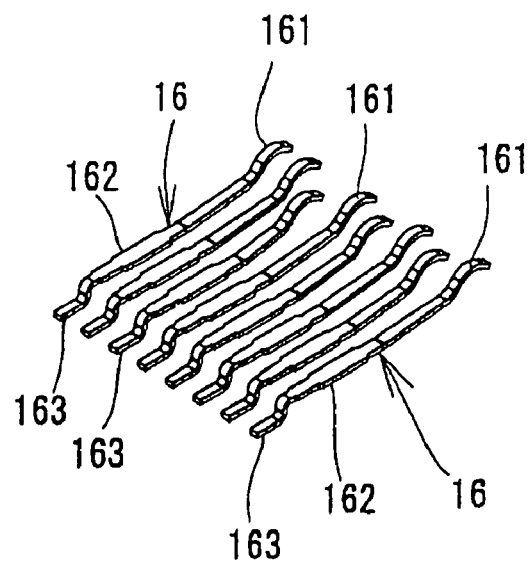
FIG. 5D is a perspective view of an arrangement of the contacts.
Figure 6A:
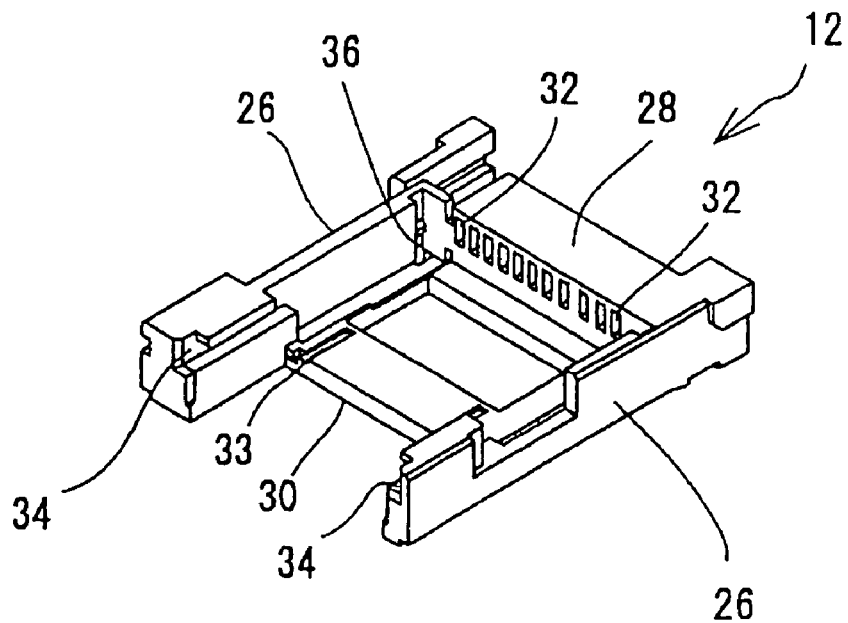
FIG. 6A is a perspective view of a housing viewed from the card inserting side.
Figure 6B:
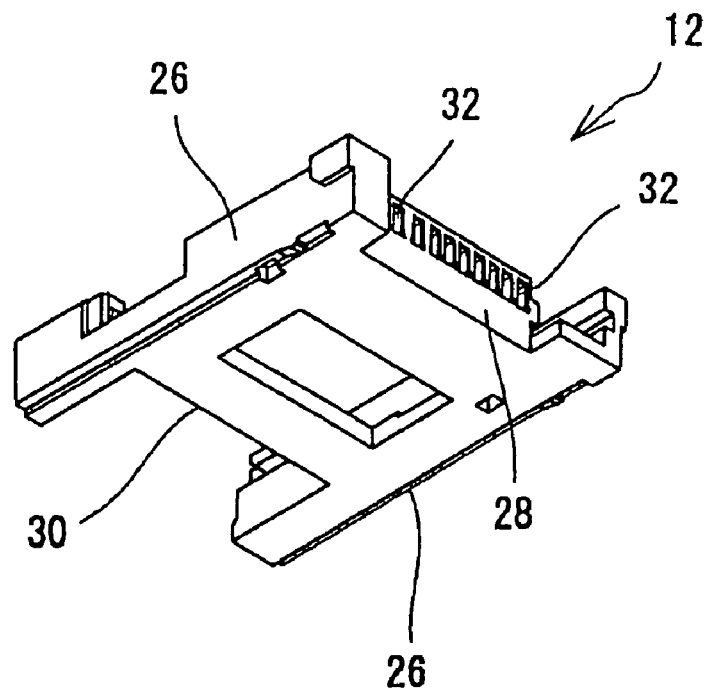
FIG. 6B is a perspective view of the housing viewed from the opposite side of the card inserting side.
Figure 7A:
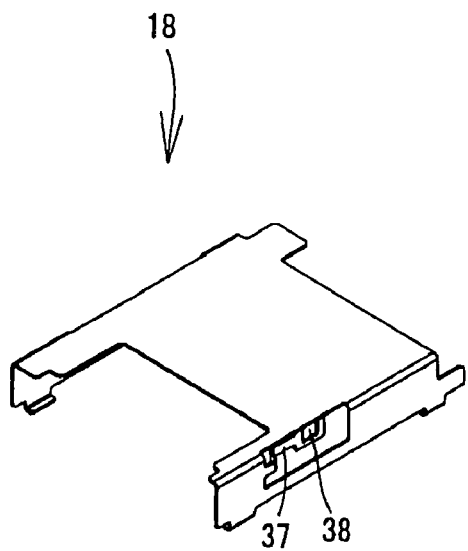
FIG. 7A is a perspective view of the shell viewed from the card inserting side.
Figure 7B:
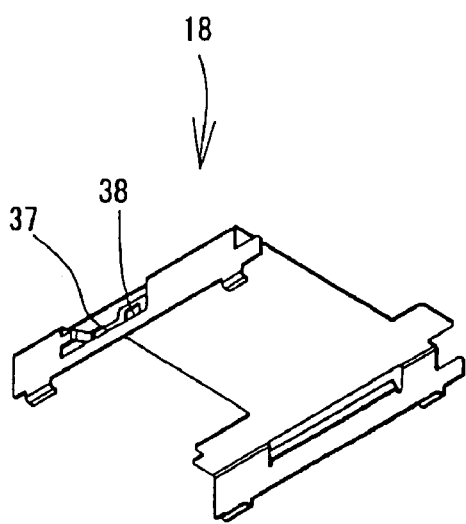
FIG. 7B is a perspective view of the shell viewed from the opposite side of the card inserting side.
Figure 8:
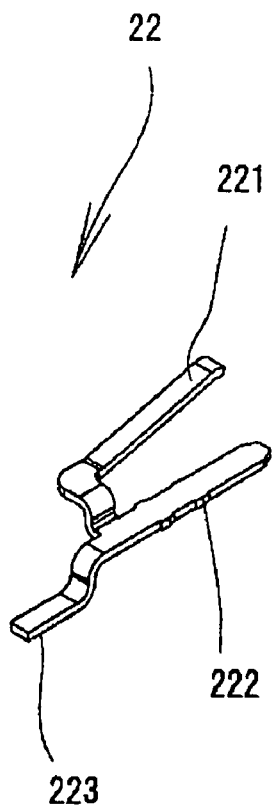
FIG. 8 is a perspective view of an antenna terminal.
Figure 9A:
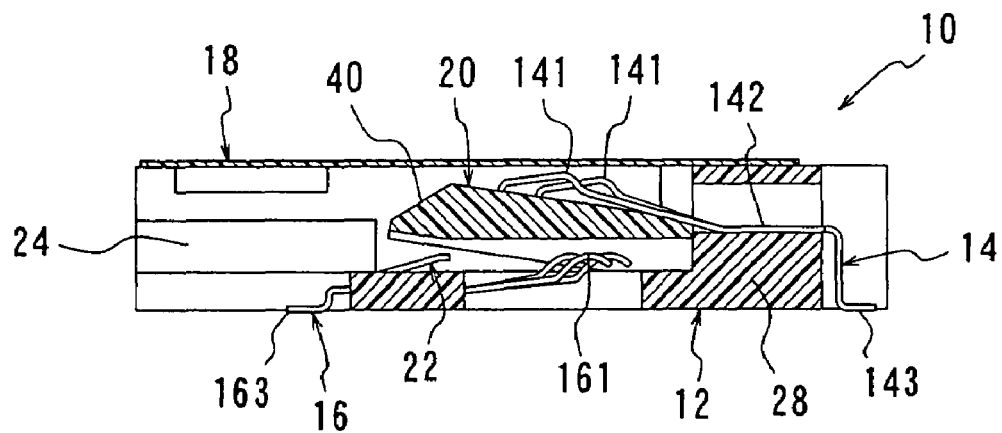
FIG. 9A is a sectional view of the card connector into which a card has not been inserted.
Figure 9B:
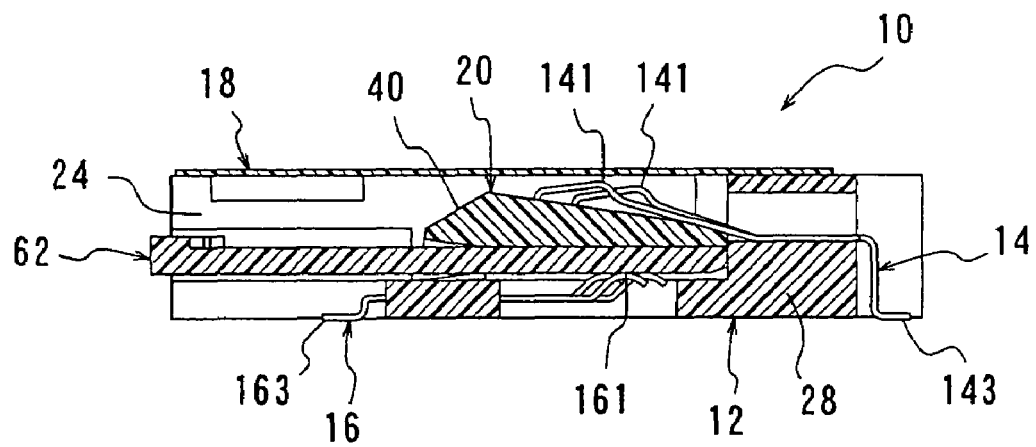
FIG. 9B is a sectional view of the card connector with one card inserted.
Figure 9C:
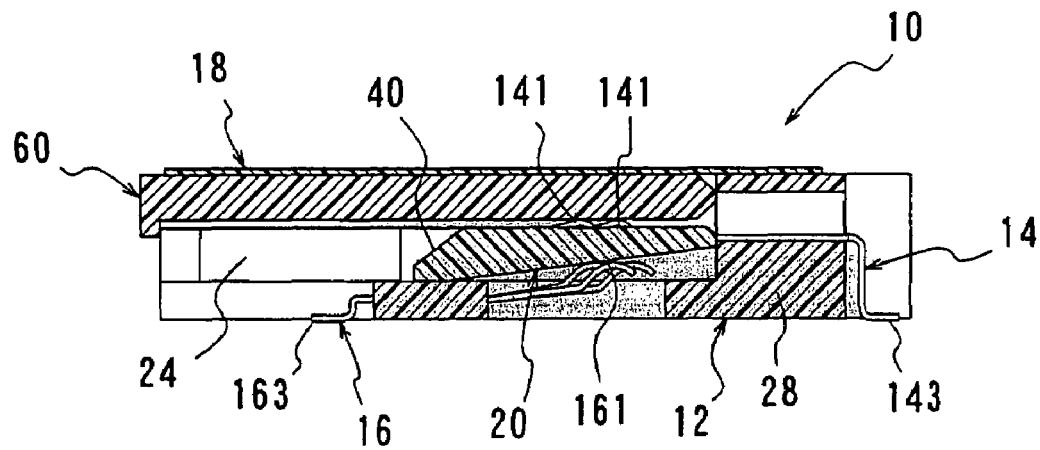
FIG. 9C is a sectional view of the card connector with the other card inserted.
Figure 10:
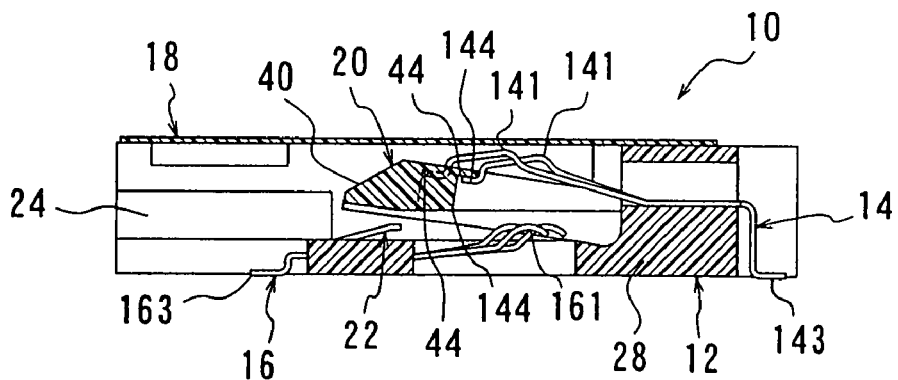
FIG. 10 is a partly sectional view of the card connector illustrating tip portions of the contacts A in engagement with engaging portions of the plate.

One embodiment of the card connector according to the invention will be explained with reference to FIG. 1A to FIG. 11I. FIG. 1A is a perspective view of the card connector according to the invention viewed from the card inserting side, and FIG. 1B is a perspective view of the card connector according to the invention viewed from the opposite side of the card inserting side. FIG. 2A is a perspective view of the card connector with one card inserted, viewed from the card inserting side, while FIG. 2B is a perspective view of the card connector with the other card inserted, viewed from the card inserting side. FIG. 3A is a perspective side, and FIG. 3B is a perspective view of the card connector with the shell removed, viewed from the opposite side of the card inserting side. FIG. 4A is a perspective view of a plate viewed from its inducing portion, while FIG. 4B is a perspective view of the plate viewed from the opposite side of the inducing portion. FIG. 5A is a perspective view of one contact A, and FIG. 5B is a perspective view of an arrangement of the contacts A. FIG. 5C is a perspective view of one contact B, and FIG. 5D is a perspective view of an arrangement of the contacts B. FIG. 6A is a perspective view of a housing viewed from the card inserting side, while FIG. 6B is a perspective view of the housing viewed from the opposite side of the card inserting side. FIG. 7A is a perspective view of the shell viewed from the card inserting side, and FIG. 7B is a perspective view of the shell viewed from the opposite side of the card inserting side. FIG. 8 is a perspective view of an antenna terminal. FIG. 9A is a sectional view of the card connector into which a card has not been inserted yet, and FIG. 9B is a sectional view of the card connector with one card inserted, while FIG. 9C is a sectional view of the card connector with the other card inserted. FIG. 10 is a partly sectional view of the card connector with the contacts A whose tips engage the engaging portions of the plate. FIGS. 11A to 11I are views for explaining the pushing out of card.

The card connector 10 of the one embodiment of the invention mainly comprises a housing 12, contacts of two kinds (contacts 14 and contacts 16), a plate 20, a shell 18, and an antenna terminal 22.

Before explaining the components of the card connector, the cards will be explained. Said cards are used for printers, card readers and the like. Said cards each mainly comprise contact portions adapted to contact the contact portions 141, 161 of the contacts 14, 16, patterns connecting from the contact portions of the card to circuits, and connection portions adapted to be connected to integrated circuits and central processing units mounted on the patterns. Cards to be used for the card connector 10 according to the invention include SD card (registered trademark), MS card (registered trademark), and MMC card (registered trademark), and more downsized cards, such as SD Micro card (registered trademark), MS Micro card (registered trademark), and Micro MMC card (registered trademark). The card connector according to the invention is constructed to accommodate two cards which are substantially equal in length in the inserting direction. Insofar as two cards have equal lengths in the inserting direction, any combinations of the two cards can be used in the card connector according to the invention. So long as cards fulfill the above condition as to length, these cards can be used in the card connector according to the invention, and further there are cards such as SIM card (Subscriber Identity Module card, registered trademark), Multimedia card (registered trademark), Mini-SD card (Mini Secure Digital memory card, registered trademark), CompactFlash card (registered trademark), xD card (registered trademark), RS-MMC card (Reduce Size MMC card, registered trademark), Transflash card (registered trademark), S card (registered trademark), Memory-stick Duo card (registered trademark) and the like, these being IC cards having built-in CPU or IC for memory.

The card connector 10 of the illustrated embodiment of the invention is constructed to receive the MS Micro card (registered trademark) 60 in the upper portion and the SD Micro card (registered trademark) 62 in the lower portion. (However, the two cards may not be inserted into the card connector at a same time, that is, once one card has been inserted into the card connector, the other card is prohibited to be inserted into the connector.)

At first, the pivotally movable plate 20 will be explained which is one important aspect of the invention. The plate 20 is formed from an electrically insulating plastic material by means of the injection molding of the known technique. The materials for the plate 20 may be suitably selected in consideration of dimensional stability, workability, manufacturing cost, and the like and generally include polybutylene terephthalate (PBT), polyamide (66PA or 46PA), liquid crystal polymer (LCP), polycarbonate (PC) and the like and combination thereof.

Said pivotally movable plate 20 is a substantially plate-shaped piece and provided with axles 46 at both ends in its width direction adapted to be fitted in bearings 36 of said housing 12 so that the plate 20 is permitted to be pivotally moved (rotated) about the axles 46. The pivotally movable plate 20 may be in a shape to form a card insertion space (inserting opening) in cooperation with the housing 12 to allow either one of the different cards by its pivotal movement. Position and size of the axles 46 are suitably designed in consideration of the function described above, the size of the card connector 10, ease of the pivotal movement (rotation) and the like.

Said pivotally movable plate 20 is formed with anchoring through-holes 42 extending through the thickness of the plate 20, whose number corresponds to the number of the contacts 14 for receiving the contacts 14. Positions of said anchoring holes 42 coincide with contacts of the MS Micro card (registered trademark) when the plate 20 is pivotally mounted on the housing 12. The size of the anchoring holes is approximately 0.05 to 0.1 mm larger than the width of the contact 14 so that mechanical friction by contacting with the walls of the anchoring holes 42 and the contacts 14 can be avoided upon the pivotal movement of the plate 20.

Said anchoring holes 42 are each provided at the end on the card inserting side with an engaging portion 44 adapted to engage a tip portion 144 of said contact 14. In this way, said plate 20 is caused to engage said contact 14 so that under the condition of no card inserted, the plate 20 is always positioned in the upper position (on the side of the shell 18) with the aid of the elastic force of said contacts 14 to provide the space (the inserting opening 24) for inserting the SD Micro card (registered trademark) 62 to be inserted into the lower portion, and further to prevent the buckling of the contacts 14. The size of the engaging portions 44 may be any size insofar as the tip portions 144 of the contacts 14 can engage the engaging portions 44 and the plate 20 can be maintained under the condition described above when no card is inserted. In order to maintain said plate 20 under such a condition (when no card is inserted) and ensure the space (the inserting opening 24) for the SD Micro card (registered trademark) 62, said plate 20 is formed at its lower end with a recess 48 commensurate with the width of the SD Micro card (registered trademark) 62.

As said plate 20 is always positioned in the upper position under the condition of no card inserted, preferably the plate 20 is provided with an inducing portion 40 on its upper surface at the end facing to the card being inserted. The shape of the inducing portion 40 may be any one so long as it enable the card to be easily induced and may be an inclined surface, rounded chamfer, or R-shape. In the illustrated embodiment, the inducing portion 40 is the inclined surface. The size of the inducing portion 40 may be any size so long as it can easily induce the MS Micro card (registered trademark) 60.

Said pivotally movable plate 20 is further provided with pivotal movememt-restraining means for restraining the plate 20 from being pivotally moved (rotated) upwardly, in order to provide the space for inserting the MS Micro card (registered trademark) 60 to be inserted in the upper portion and make easy its insertion. The pivotal movement-restraining means may be any one insofar as it fulfills such functions. In the illustrated embodiment, said plate 20 is provided at one end of said inducing portion 40 in the width direction with an anchoring protrusion 50 adapted to engage in an engaging hole 38 formed in said shell 18, thereby restraining the pivotal movement (rotation) of the plate 20 (toward the shell 18). The anchoring protrusion 50 is a cylindrical column in the illustrated embodiment, but it may be of any shape so long as it can restrain the pivotal movement of the plate 20. The position and size of said anchoring protrusion 50 may be any ones so long as it can engage said engaging hole 38 to restraint the pivotal movement (rotation) of the plate 20 upwardly (toward the shell 18), and may be suitably designed.

The housing 12 will then be explained. The housing 12 is formed from an electrically insulating plastic material by means of the injection molding of the known technique. The materials for the housing 12 may be suitably selected in consideration of dimensional stability, workability, manufacturing cost, and the like and generally include polybutylene terephthalate (PBT), polyamide (66PA or 46PA), liquid crystal polymer (LCP), polycarbonate (PC) and the like and combination thereof.

Said housing 12 includes two side walls 26, a rear wall 28, and a lower wall 30 contiguous with these side and rear walls 26 and 28, and these two side walls 26, rear wall 28 and lower wall 30 form the respective inserting openings 24 for the memory cards.

More precisely, the card inserting opening 24 for receiving either one of two different cards is so constructed that to accept only one of either of two different cards by a pivotal rotation of the pivotally movable plate 20. In other word, under the condition of no card is inserted, the lower space (the inserting opening 24) is formed for the SD Micro card (registered trademark) 62, while when the MS Micro card (registered trademark) 60 is being inserted into the upper portion, the plate 20 is forced to be rotated downwardly to form the upper space (the inserting opening 24) for the MS Micro card (registered trademark) 60.

Moreover, installed in said housing 12 are the contracts 14 and the contacts 16 corresponding to the cards 60 and 62, respectively, which are fixed to the housing 12 by integral molding, press-fitting, hooking (lancing), welding and the like. In the illustrated embodiment, said contacts 14 are fixed to the housing 12 by press-fitting, and said contacts 16 are fixed to the housing 12 by integral molding (molding the housing together with the contacts 16 previously arranged in a mold).

Arranged in the housing 12 are the contacts 14 and 16 in a manner that connection portions 143 of the contacts 14 corresponding to the MS Micro card (registered trademark) 60 extend onto the opposite side of the card inserting side, and connection portions 163 of the contacts 16 corresponding to the SD Micro card (registered trademark) 62 extend onto the card inserting side. The housing 12 is formed with the respective inserting holes 32 at locations corresponding to the contacts 14 and 16. (As the contacts 16 are fixed to the housing 12 by integral molding in the illustrated embodiment, no inserting holes 32 for said contacts 16 are required.)

Said housing 12 is formed with guide grooves 34 in the inner faces of both the side walls 26 for guiding the MS Micro card (registered trademark) 60 toward said contacts 14. The widths of the guide grooves 34 are approximately 0.1 mm larger than the thickness of the MS Micro card (registered trademark) 60. When no card is inserted, said plate 20 is always positioned in the upper portion so that the MS Micro card (registered trademark) 60 can be easily inserted with the aid of the guide grooves 34 and the inducing portion 40 provided on said plate 20.

Said housing 12 is further formed with an inserting groove 33 in which said antenna terminal 22 is inserted. Said antenna terminal 22 is fixed in the housing by integral molding, press-fitting, hooking (lancing), welding, and the like. The antenna terminal 22 is fixed to the housing by press-fitting in the illustrated embodiment.

Further, said housing 12 is provided with bearings 36 at locations corresponding to the axles 46 of said plate 20. Said bearings 36 need only enable the pivotal movement (rotation) of said plate 20, and the shape and size of said bearings 36 may be suitably designed to enable the pivotal movement (rotation) of said plate 20.

The contacts 14 and the contacts 16 will then be explained. The contacts 14 and the contacts 16 are made of a metal and formed by means of the press-working of the known technique. Preferred metals from which to form said contacts 14 and the contacts 16 include brass, beryllium copper, phosphor bronze and the like which comply with the requirements as to springiness, electric conductivity, and the like. Said contacts 14 and said contacts 16 each mainly comprise a contact portion 141, 161 adapted to contact the contact of the memory card, a fixed portion 142, 162 to be fixed to said housing 12, and a connection portion 143, 163 to be connected to a substrate. As shown in FIGS. 5B and 5D, required numbers of said contacts 14 and 16 are arranged, some contacts of which are of a sequential structure for the purpose of protecting the cards and delaying the timing of contact. In the illustrated embodiment, the two contacts 14 (the third and fourth contacts from the right end of the contacts 14 arranged in a row viewed in FIG. 5B) among the eleven contacts 14 serve as ground contacts which contact the MS Micro card (registered trademark) 60 before other contacts (signal contacts) can contact the card, thereby discharging any static electricity. In other words, the card 60 is protected from the static electricity damage. In the illustrated embodiment, the three contacts 16 (the two contacts at both the ends and the third contact from the left end of the contacts 16 arranged in a row as viewed in FIG. 5D) among the eight contacts 16 serve as ground contacts, these three contacts being connected in electrically continuity through the substrate. The two contacts at both the ends are initially not in contact with the SD Micro card (registered trademark) 62 when the card is about to be removed, and the third contact from the left end initially comes into contact with the SD Micro card (registered trademark) 62 when the card is inserted, thereby protecting the card. The remaining five contacts are signal contacts, and of a sequential structure to delay the timing of contact, thereby facilitating reading and writing.

Said contacts 14 correspond to the MS Micro card (registered trademark) 60, and the connection portions 143 of the contacts 14 may be suitably designed in consideration of the circuit design and occupied area of the substrate, and size and design of the connector. In the illustrated embodiment, the connection portions 143 of the contact 14 extend onto the opposite side of the card inserting side and are of surface mounting type (SMT) as shown in FIG. 1B. Said contacts 14 each include on the opposite side of the connection portion 143 the tip portion 144 adapted to engage the engaging portion 44 of said plate 20. The effects of the engagement of the tip portion 144 are as described above. The contact portions 141 of the contacts 14 are curved so as to facilitate the contacting with contacts of the MS Micro card (registered trademark) 60.

Said contacts 16 correspond to SD Micro card (registered trademark) 62, and the connection portions 163 of the contacts if may be suitably designed in consideration of the circuit design and occupied area of the substrate, and size and design of the connector. In the illustrated embodiment, the connection portions 163 of the contact 16 extend onto the card inserting side and of surface mounting type (SMT) as shown in FIGS. 1A and 1B. The contact portions 161 of said contacts 16 are curved so as to facilitate the contacting with contacts of the SD Micro card (registered trademark) 62.

The antenna terminal 22 will then be explained. The antenna terminal 22 is made of a metal and formed by means of the press-working of the known technique. Preferred metals from which to form said antenna terminal 22 include brass, beryllium copper, phosphor bronze and the like which comply with the requirements as to springiness, electric conductivity, and the like. Said antenna terminal 22 mainly comprises a contact portion 221 adapted to contact the contact of the memory card and a fixed portion 222 to be fixed to said housing 12.

Said antenna terminal 22 corresponds to the SD Micro card (registered trademark) 62. When the contact portion 221 of said antenna terminal 22 comes into contact with the contact of the SD Micro card (registered trademark) 62, a signal is transmitted through electronic radio waves.

When one card 60 is inserted, the plate 20 is pivotally moved (rotated) to cause the antenna terminal 22 to be pushed toward said contact 16 so that the clearance between the contact 16 and the antenna terminal 22 becomes narrower, thereby preventing noise between said contact 14 and said antenna terminal 22.

Said antenna terminal 22 is arranged in parallel with said contact 16 (at the left end of the contacts 16 arranged in the one row viewed in FIG. 5D) in the direction of its thickness.

In the illustrated embodiment, the inserted cards 60 and 62 are manually removed. It is envisioned that methods for removing cards includes an eject system (not shown) and a push system. A method for removing cards may be suitably determined in consideration of specifications, miniaturization of the connector, protection of cards, and the like. The eject system may includes an eject button as a separate part. The push system may have a so-called heart cam provided at a predetermined position so that a card is removed by further pushing the card inwardly of the card connector. In the illustrated embodiment, a plate-shaped piece 21 in the form of substantially J-shape is movably provided on the one side wall 26 of said housing 12 so as to be combined with a so-called heart cam, thereby enabling an inserted card to be removed by the push system (the card is popped out upon pushing the card).

Figure 11A:
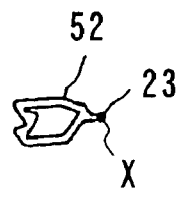
FIGS. 11A to 11I are views for explaining the pushing out of the card.
Figure 11B:
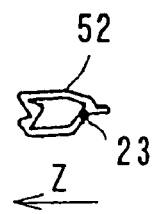
Figure 11C:
Figure 11D:
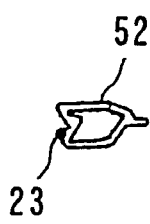
Figure 11E:
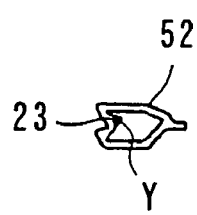
Figure 11F:
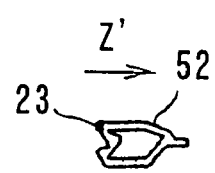
Figure 11G:
Figure 11H:
Figure 11I:
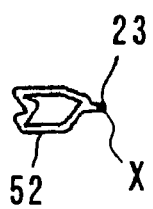

A push-out structure for cards will be explained with reference to FIGS. 11A to 11I. These drawings illustrate successive states that the tip of a coil spring 23 moves along cut grooves 52 forming a heart-shape. In the illustrated embodiment, a plate-shaped piece 21, a coil spring 23, and a heart cam are used in consideration of manufacturing cost, ease to assemble, and miniaturization of the connector. Either of the side walls of said housing 12 is formed with cut grooves 52 substantially in the form of a heart, and the tip of the coil spring 23 is caused to engage in the cut grooves 52, while the other end of said coil spring 23 is held on said plate-shaped piece 21. When a card is inserted, one end of the card comes into contact with and causes the end face of the plate-shaped piece 21 to be pushed inwardly. Before the card being inserted (or the card has been removed), the tip of said coil spring 23 is positioned in the position X (FIGS. 11A and 11I), while when the card has been completely inserted, the tip of said coil spring 23 is positioned in the position Y (FIG. 11E). When it is desired to remove the card, said card is somewhat pushed (that is, said plate-shaped piece 21 is pushed) so that the tip of said coil spring 23 moves on the side of an arrow "Z" (FIG. 11B) to the position X, whereby the card is removed with the aid of the elastic force of the coil spring 23. When it is desired to insert the card, said coil spring 23 is pushed by the card so that the tip of said coil spring 23 is moved on the side of an arrow "Z'" (FIG. 11F) to the position Y, whereby the insertion of the card has been completed.

Finally, the shell 18 will be explained. The shell 18 is made of a metal and formed by means of the press-working of the known technique. Preferred metals from which to form said shell 18 include brass, beryllium copper, phosphor bronze and the like which comply with the requirements as to workability, soldability and the like.

Said shell 18 has a substantially U-shaped cross-section and serves to hold a card, to prevent the MS Micro card (registered trademark) 60 inserted in the upper portion from floating, to achieve the stable contact, to prevent noise, and to securely fix the card connector 10 to the substrate.

Said shell 18 is provided with pivotal movement-restraining means for restraining the pivotal movement (rotation) of the plate 20 in order to facilitate the insertion of the MS Micro card (registered trademark) 60 to be inserted into the upper portion of the card connector and to ensure a sufficient space into which the MS Micro card 60 is inserted. The pivotal movement-restraining means need only be able to fulfill such functions, and in the illustrated embodiment said plate 20 is provided at one end of said inducing portion 40 with an anchoring protrusion 50 adapted to engage in the engaging hole 38 formed in said shell 18, thereby restraining the pivotal movement (rotation) of the plate 20 (toward the shell 18). In more detail, said shell 18 is provided with an elastic piece 37 in the form of a substantially L-shape formed near its tip with the engaging hole 38. The shape of the engaging hole 38 is elliptical in the illustrated embodiment, but it may be any one so long as it can engage the anchoring protrusion 50 of the plate 20 to restrain the pivotal movement of the plate 20. The position and size of said engaging hole 38 may be any ones insofar as the hole 38 can engage the anchoring protrusion 50 and the plate 20 is restrained from pivotally moving (rotating) upwardly (toward the shell 18), and may be suitably designed.

When the MS Micro card (registered trademark) 60 is inserted into the upper portion of the card connector, said elastic piece 37 is pushed outwardly by the card 60 so that the engaging hole 38 of said elastic piece 37 disengages from the anchoring protrusion 50 of said plate 20, thereby enabling said plate 20 to pivotally move (rotate) downwardly. In contrast herewith, when the SD Micro card (registered trademark) 62 is inserted into the lower portion of the card connector, said elastic piece 37 is not pushed by the card 62 so that the plate 20 is not pivotally moved (rotated) upwardly (toward the shell 18), with the result that the pivotal movement (rotation) of the plate 20 upwardly (toward the shell 18) can be restrained. The positional relationship of said elastic piece 37 and said engaging hole 38 of said shell 18 and the anchoring protrusion 50 of said plate may be suitably designed in consideration of these functions. In other words, upon insertion of the MS Micro card (registered trademark) 60 into the upper portion, once said engaging hole 38 disengages from the anchoring protrusion 50, but when the card is being removed from the upper portion, said plate 20 is returned to its normal position (the state prior to the insertion of the card 60) and thereafter said elastic piece 37 is displaced and its engaging hole 38 engages said anchoring protrusion 50.

The card connector has been explained with the construction receiving the MS Micro card (registered trademark) 60 in its upper portion and the SD Micro card (registered trademark) 62 in its lower portion (however, two cards cannot be inserted at a time, that is, once one card has been inserted, the other could not be inserted). It will be understood that any combinations of two cards having equal lengths in the inserting direction may be used for the card connector according to the invention.

Examples of applications of the present invention include card connectors being capable of exchanging signals between the connector and a memory card inserted in the connector for use in various electric and electronic appliances such as a mobile phone, PDA (personal digital assistant), printer, card reader and the like, and particularly card connectors with structure being capable of achieving stable connection by merely inserting two cards of different kinds having equal lengths in the inserting direction and different widths and thicknesses.

While the invention has been particularly shown and described with reference to the preferred embodiments thereof, it will be understood by those skilled in the art that the foregoing and other changes in form and details can be made therein without departing from the spirit and scope of the invention.

What is claimed is:

1. A card connector into and from which two differently configured memory cards can be detachably inserted and removed, said card connector including contacts adapted to receive contacts of the two memory cards, respectively, a housing having openings into which the memory cards can be inserted, respectively, and arranging and holding said contacts of said card connector therein, and a shell covering said housing, wherein said housing comprises two side walls, a rear wall, and a lower wall contiguous with the side and rear walls to form said openings for said memory cards, and said housing is provided with a pivotally movable plate configured, by its pivotal movement, to allow one of said openings to receive one of said memory cards and simultaneously prevent another of said openings from receiving the other of said memory cards.

2. The card connector as set forth in claim 1, wherein the card connector is constructed to accommodate two cards having substantially equal lengths in the inserting direction.

3. The card connector as set forth in claim 1, wherein said pivotally movable plate includes restraining means for said plate.

4. The card connector as set forth in claim 3, wherein the card connector is constructed to accommodate two cards having substantially equal lengths in the inserting direction.

5. The card connector as set forth in claim 3, wherein connection portions of the contacts of said card connector respectively extend onto the opposite sides of said pivotally movable plate, and wherein said pivotally movable plate is provided with anchoring holes into which said contacts are inserted and with engaging portions adapted to engage tip portions of said contacts.

6. The card connector as set forth in claim 5, wherein the card connector is constructed to accommodate two cards having substantially equal lengths in the inserting direction.

7. The card connector as set forth in claim 5, wherein said pivotally movable plate is provided with an inducing portion, and said side walls of said housing are each provided on an inner side with a guide groove.

8. The card connector as set forth in claim 7, wherein the card connector is constructed to accommodate two cards having substantially equal lengths in the inserting direction.

9. The card connector as set forth in claim 3, wherein said pivotally movable plate is provided with an inducing portion, and said side walls of said housing are each provided on an inner side with a guide groove.

10. The card connector as set forth in claim 9, wherein the card connector is constructed to accommodate two cards having substantially equal lengths in the inserting direction.

11. The card connector as set forth in claim 1, wherein connection portions of the contacts of said card connector respectively extend onto the opposite sides of said pivotally movable plate, and wherein said pivotally movable plate is provided with anchoring holes into which said contacts are inserted and with engaging portions adapted to engage tip portions of said contacts.

12. The card connector as set forth in claim 11, wherein the card connector is constructed to accommodate two cards having substantially equal lengths in the inserting direction.

13. The card connector as set forth in claim 11, wherein said pivotally movable plate is provided with an inducing portion, and said side walls of said housing are each provided on an inner side with a guide groove.

14. The card connector as set forth in claim 13, wherein the card connector is constructed to accommodate two cards having substantially equal lengths in the inserting direction.

15. The card connector as set forth in claim 1, wherein said pivotally movable plate is provided with an inducing portion, and said side walls of said housing are each provided on an inner side with a guide groove.

16. The card connector as set forth in claim 15, wherein the card connector is constructed to accommodate two cards having substantially equal lengths in the inserting direction.

* * * * *